United States Patent [19]

Buzzi

[11] 3,902,352

[45] Sept. 2, 1975

[54] APPARATUS FOR CHECKING THE EFFICIENCY OF SHOCK ABSORBERS ON VEHICLES

[76] Inventor: Luigi Buzzi, Via Risorgimento, 60, Mandello Del Lario (Como), Italy

[22] Filed: Apr. 1, 1974

[21] Appl. No.: 456,772

[30] Foreign Application Priority Data
June 11, 1973 Italy.................................. 7256/73

[52] U.S. Cl. .................................................. 73/11
[51] Int. Cl.² ........................................ G01M 17/04
[58] Field of Search...................... 73/11, 71.7, 67.1

[56] References Cited
UNITED STATES PATENTS

| | | | |
|---|---|---|---|
| 2,799,158 | 7/1957 | Federspiel | 73/71.7 |
| 3,690,145 | 9/1972 | Brisard | 73/11 |
| 3,720,091 | 3/1973 | Kiefer | 73/11 |
| 3,815,404 | 6/1974 | Brisard | 73/11 |

FOREIGN PATENTS OR APPLICATIONS
900,272    7/1962    United Kingdom.................. 73/67.1

OTHER PUBLICATIONS

W. B. Bradley, Jr.; "Mechanical Impedance Testing," Endevo Tech. Paper (TP202), pp. 1–10, Jan. 1964.

*Primary Examiner*—Charles A. Ruehl
*Attorney, Agent, or Firm*—Karl W. Flocks

[57] ABSTRACT

A suspension check-up device for a motor car is disclosed, which is capable of checking up the efficiency of the shock absorbers of a vehicle without removing it from the vehicle. The device comprises means for causing a wheel of the vehicle and its suspension to be periodically oscillated, a phase indicator to count the oscillations, and a force detector for measuring the force impressed to the wheel. A comparator compares the phase signal with the force signal and gives the time shift between the two signals. The waveform of the force plot (if drawn by a plotting device) can also give to a skilled operator an indication as to the nature of the possible defect of a shock absorber.

3 Claims, 6 Drawing Figures

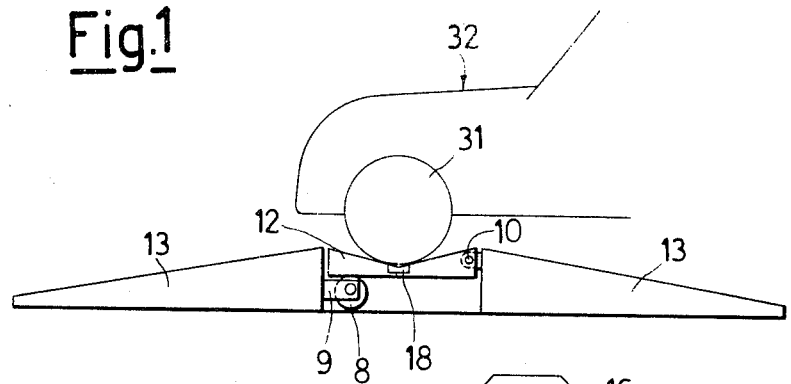
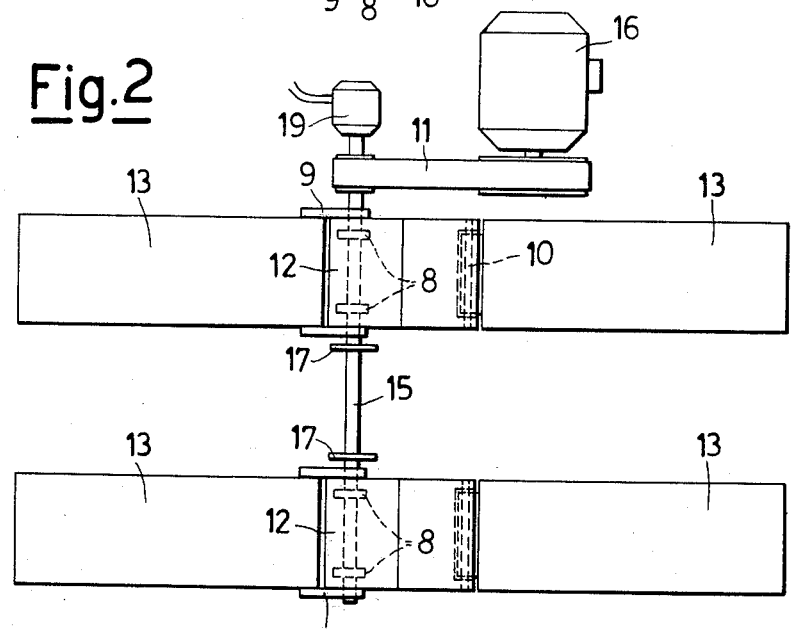
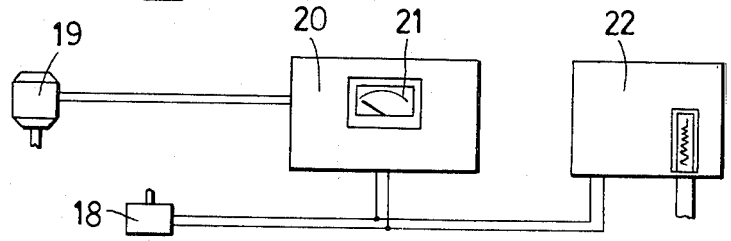

APPARATUS FOR CHECKING THE EFFICIENCY OF SHOCK ABSORBERS ON VEHICLES

In vehicles equipped with resilient suspensions the shock absorbers have the task of absorbing the energy of the vibrations as caused by external agents so as to restore the vehicle to its normal equilibrium trim. If the shock absorbers are defective, the wheels, no longer hindered in their motion, freely swing and, in extreme cases, they are lifted from the ground. The car body, as a result, is no longer stable but is subjected to the known swinging motions of rolling, pitching and pumping and the road-holding is moreover poor.

Even though the several shock absorbers of a vehicle are irregularly defective, for example if the shock absorber on a side is regular and that of the opposite side is defective, the road-holding ability is dangerously compromised, especially when the road is up or in turns.

A satisfactory operation of the shock absorbers is thus essentially for safe driving and for passengers' comfort.

This fact requires a frequent inspection of the efficiency of the shock absorbers, which may undergo a quick wear due to the high stresses to which they are subjected.

The conventional apparatus which are capable of checking the shock absorber alone, as withdrawn from its vehicle, have the defect that they require the overhauling of the shock absorber, a cumbersome operation which sometimes requires that the entire suspension be removed without having regard to the other causes of friction and dampening of the suspension, delivering data which do not correspond to the actual working conditions of the shock absorbers.

It is for this reason that an efficient and reliable shock absorber check-up can only be achieved with tests directly carried out on the vehicles, by using apparatus which make possible measurements and comparison by the instrumentality of numerical and graphical indications, inasmuch as the old method of shaking by hand the car body and observing the thusly induced swinging motion is both subjective and apparently not up to the point.

Checking apparatus are known in which the previously lifted vehicle is allowed to fall, in which a specially provided device draws a plot of the car body oscillations as caused by the fall. The amplitudes of these oscillations and the shape of the plot serve to an evaluation of the efficiency of the shock absorbers. However, since the oscillations are quickly dampened within a few cycles, the results are difficult to be interpreted and are not always reproducible.

Another conventional device generates vertical oscillation on a platform on which the wheel relative to the suspension under check has been placed, until bringing the vibrations to a frequency over the critical frequency of the suspension. Once the vibration generator has been stopped, the suspension continues to be oscillated until the vibratory motion passes through the resonance conditions. A plot of the vibration amplitude as drawn during the slowing down by means of a specially provided device permits to have indications as to the state of the shock absorbers.

Finally, shock-absorber check up devices are known in which the reactive forces of a suspension are measured, the wheel being placed on a platform which vibrates in the vertical direction, a detector (e.g. a piezoelectric detector) being arranged under the wheel, which is capable of producing electric pulses which are proportional to the forces transferred by the platform to the wheel during the constant-frequency vibrations.

In all of these devices, the magnitudes which are measured and are intended for the check-up are either a vibration amplitude or a reactive force against the vibration. These are magnitudes which are a function, not only of the dampening ability of the shock absorber but also, in a significant way, of other characteristics of the resilient system: intervening masses, resiliency of the suspensions and the tires, vibration frequency, position of the car on the platform. Slight displacements of the wheel on the platform relative to the prescribed position in the axial direction, the longitudinal direction, or the steering direction, differences in the tire pressures, changes in the vehicle mass (full or empty fuel tank) are sometimes sufficient to cause significant variations of the values of the oscillation amplitudes or the reactive forces.

Another defect with these devices is the necessity of carrying out the tests in two times for the two wheels of the same axle, so as to overcome errors due to the mutual influence of the vibrations in the two wheels. Lastly, the measurement is usually made by examining a plot whose interpretation requires experience and is both subjective and questionable.

In order to do away with the defects of the known art and to obtain a reliable measurement of the dampening efficiency of a shock absorber, the invention suggests to provide a device which is characterized in that it comprises actuating means adapted to impress to at least one wheel of a motor vehicle a periodical oscillatory vertical motion, first sensing means adapted to measure the displacements of the wheel, second sensing means of at least one magnitude which is a function of the instantaneous force as transferred by the shock absorber, processing means for the periodical signals as emitted by the first and second sensing means adapted to indicate the time shift.

The magnitude which is a function of the force transferred by the shock absorber has proved to be, with advantage, the force as applied to the wheel by the actuating means, that is, the displacement produced in the suspended mass of the vehicle.

In order that the objects and advantages of the invention may more clearly appear, exemplary embodiments thereof will now diagrammatically illustrated, as shown in the accompanying drawings, wherein:

FIG. 1 diagrammatically shows in elevational view a device according to the invention, while acting on a suspension of a motor vehicle.

FIG. 2 is a plan view of the device of FIG. 1.

FIG. 3 is a block diagram of the sensing circuit for the device of FIGS. 1 and 2.

Figure 4:
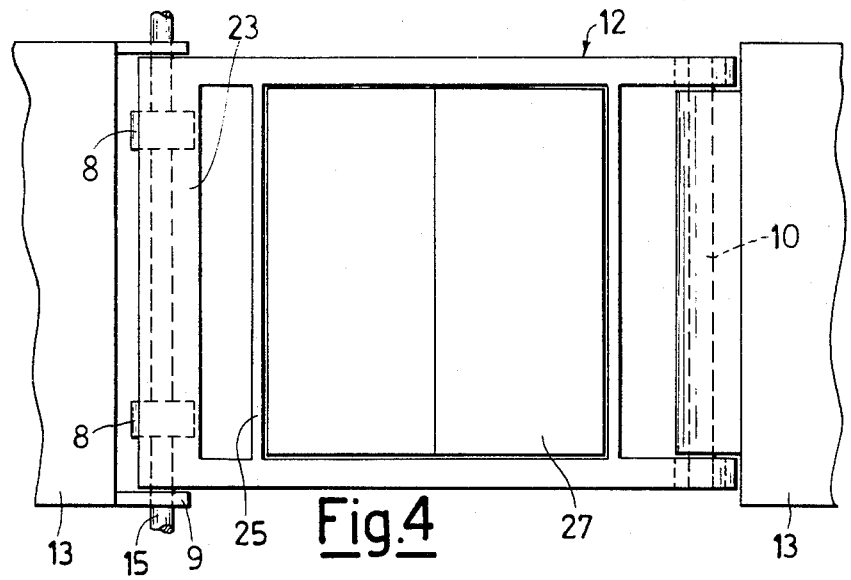
FIGS. 4 and 5 show, in plan view and elevational view, respectively, a detail of the apparatus according to the invention.

In FIGS. 1 and 2 there is shown an apparatus which comprises two couples of ramps 13 between which there are mounted, for oscillation about pins 10, two platforms 12 which rest against eccentrics 8 as borne by a shaft 15: the latter is divided, with advantage, into sections which are connected by joints 17 and can rotate about fixed supporting members 9.

A motor 16, through the drive transfer 11, drives to rotation the shaft 15, so that the platforms 12 are caused to oscillate.

On the shaft 15 a phase generator 19 is also mounted, which is capable of delivering an electric signal which is a function of the positions of the cams 8 and thus of the platforms 12.

In correspondence with each platform 12 a detector is mounted, which is diagrammatically shown at 18 and measures the force transferred by the platform 12 to the wheel 31 of a vehicle 32, and is adapted to emit an electric signal which is a function of such a force.

In FIG. 3 it has been shown how the signals, as delivered by the phase generator 19 and the detector 18 are sent to a processing unit 20, which compares said signals giving at 21 an indication of the time shift between the as received periodical signals.

The processing unit 20 and detector 18 are also connected with a plotting device 22 which draws the plot of the periodical signal emitted thereby.

In order that the operation of the apparatus described above may be better understood, one can consider a suspension of a motor vehicle as formed by two masses, the suspended mass (car body), and the non-suspended mass (wheel and suspension), respectively. These two masses are connected by a system which can be symbolically represented by a spring and a hydraulic shock absorber placed in parallel.

The equilibrium equation in one of the masses, subjected to a periodically variable force, with respect to the other mass, regarded as a fixed one, is, as is well known:

$$m \frac{d^2x}{dt^2} + c \frac{dx}{dt} + K x = F \sin \omega t$$

wherein $m$ is the mass of the oscillating body, $K$ the elasticity constant of the spring, $c$ is the dampening constant for the viscous type, $x$ the instantaneous distance of the centre of gravity of the mass from its position in equilibrium in the system, $F \sin \omega t$ the instantaneous value of the force, which is periodically varied at the frequency.

By solving the equation in polar coordinates, the particular result is obtained that $$\tan \phi = \frac{c \omega}{K - m \omega^2}$$

wherein $\phi$ is the angle of phase shift between the rotary vector which represents the exciting force and that which represents the displacement $x$.

On considering that $\omega$ is the vibration frequency of the apparatus, and thus can be determined beforehand, and $K$ and $m$ are constant specifications for each vehicle, the result is that the phase shift $\phi$ is a univocally defined accurate function of the dampening constant $c$ which is indicative of the efficiency of the shock absorber.

To measure the efficiency of the dampening of the shock absorbers of the front suspension of the vehicle 32, the wheels 31 are placed on the platforms 12, which are put in synchronous oscillation by actuating the motor 16.

The speed of rotation of the shaft 15 is adjusted to an appropriately high value so that the suspension is deformed, that is the wheel undergoes an oscillation which is different from that of the car body. More detailedly, for a sufficiently quick frequency of oscillation of the platforms 12, the car body is virtually stationary and behaves like a seismic mass.

Under these conditions, the generator 19 emits a periodical signal which is synchronized with the oscillatory reciprocation of the platforms, and this signal is compared with the signal which comes from the detector 18, in the comparator 20 which indicates at 21 the phase shift between the two signals.

On the basis of the foregoing, the phase shift will be a function of the efficiency of the shock absorbers as mounted on the front suspension of the vehicle being tested. Obviously it is possible, with an appropriate testing technique, to strip the phase shift as measured of the components due to the characteristics inherent in the apparatus, so as to track the actual phase shift as due to the dampening action of the shock absorber.

The presence of the plotting device 22 permits, if so desired, to examine the waveform of the plot of the variation of the force as transferred by the platform 12 to the wheel 31. This force should be regarded as the exciting force of the system and its trend in time could give a skilled operator useful indications as to the kind of defect of the shock absorber.

Figure 5:
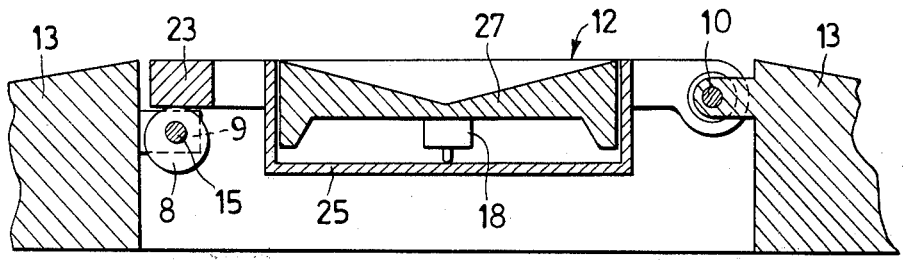

FIGS. 4 and 5 show, in greater detail an embodiment which could have a platform 12. It is composed by a rigid frame 23, in the central portion of which, 25, the rest member 27 is freely movable and is intended to receive the wheel, and reacts against the detector 18. The detector 18 is properly selected among those which are capable of emitting a signal which is a function of the compression they undergo, of resistive, piezo-electric, electromagnetic, magnetostrictive type and the like.

Of course, the portion 27 can also be made resiliently yielding rather than slidable, with one of the possible balance-type arrangements.

Figure 6:
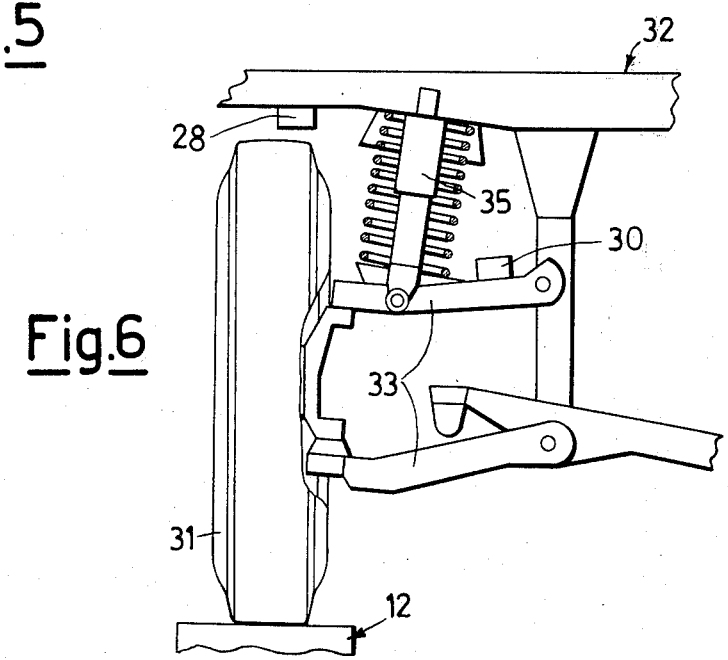
FIG. 6 is a diagrammatical showing of a motor vehicle suspension while being subjected to check up with the device according to the invention.

FIG. 6 diagrammatically shows a suspension for a motor vehicle 32, the suspension comprising parallelogram arms 33 which linkably support the wheel 31. The suspension further comprises the spring 34, coaxially with which the shock absorber 35 is mounted.

The spring and the shock absorber yieldably connect a swinging arm 33 with the vehicle frame, according to a conventional general arrangement.

Consistently with the principles of the invention, the efficiency of the shock absorber 35 can easily be determined also by considering the oscillatory motion of the vehicle 32, rather than the force transferred by the platform to the wheel, inasmuch as such a motion is a function of that force. The phase comparator 20 could process in this case the signal coming from the generator 19 and compare it with the signal of a vibration detector as indicated at 28 and applied to the vehicle frame. The phase shift between these two signals is still a function of the dampening efficiency of the shock absorber 35.

The generator 19 sends to the phase comparator 20 a signal which is a function of the movement of the wheel 31 on a vertical plane. This signal can easily be obtained with a direct measurement of the wheel motion, or, in general, the motion of the non-suspended masses of the suspension: for example FIG. 6 shows a detector 30 of a seismic type as applied to an arm of the suspension, said detector emitting a signal which is a univocal function of the signal emitted by the generator 19, the mechanical linkage between the movement of the camshaft 15 and the non-suspended portion of the motor vehicle being substantially rigid, in the case in point an arm 33.

The phase comparator 20 can thus receive for processing signals one of which comes from a seismic detector 28 applied to the car body and the other from a detector applied to the wheel or any other member which is rigidly connected to the wheel, for effecting a movement which is a function of the movement of the wheel.

Many changes can be provided for the device which specifically measures the force transferred by the platform to the wheel, such as for example a stress detector of conventional make can be inserted between the cams 8 and the platform 12.

The same platform can consist of a yieldable structure, where the yielding is measured by a conventional detector adapted to emit an electric signal which is a function of the yielding.

What is claimed is:

1. A device for measuring the dampening efficiency of a shock absorber mounted between two members of a vehicle suspension which are relatively movable with respect to one another, such device comprising a support means including a wheel supporting portion for at least one wheel of the vehicle, actuating means engaged with an actuated portion of said support means to impart thereto a periodical vertical oscillatory motion to cause corresponding movement of the wheel, first sensing means adapted to measure the displacements of said actuated portion of the support means and to produce corresponding periodical displacement signals, second sensing means located on said support means between said actuated and wheel supporting portions thereof to measure the force transferred by said support means to the wheel resting thereon and to produce corresponding periodical force signals and processing means for processing said displacement and force signals and indicating the phase relationship therebetween.

2. A device according to claim 1, wherein said support means is formed by an oscillating platform having a horizontal pivot axis and said actuating means are formed by a rotating cam on which said platform is resting, said wheel supporting portion of the support means being formed by a yielding portion of said platform.

3. A device according to claim 2, wherein said first sensing means are operatively connected to said rotating cam.

* * * * *